US012298684B2

(12) United States Patent
Watanabe et al.

(10) Patent No.: US 12,298,684 B2
(45) **Date of Patent: *May 13, 2025**

(54) BELT CLEANING BLADE, IMAGE FORMING APPARATUS, AND TRANSFER DEVICE

(71) Applicant: FUJIFILM BUSINESS INNOVATION CORP., Tokyo (JP)

(72) Inventors: Yusuke Watanabe, Kanagawa (JP); Daisuke Tano, Kanagawa (JP); Yuka Kawamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/586,826

(22) Filed: Feb. 26, 2024

(65) Prior Publication Data

US 2025/0076790 A1 Mar. 6, 2025

(30) Foreign Application Priority Data

Aug. 30, 2023 (JP) ................................ 2023-140514

(51) Int. Cl.
*G03G 15/16* (2006.01)

(52) U.S. Cl.
CPC ... *G03G 15/161* (2013.01); *G03G 2215/1661* (2013.01); *G03G 2221/0005* (2013.01)

(58) Field of Classification Search
CPC ............... G03G 15/161; G03G 15/162; G03G 2215/1661; G03G 2221/0005
See application file for complete search history.

(56) References Cited

U.S. PATENT DOCUMENTS

| | | | | |
|---|---|---|---|---|
| 12,135,520 | B2 * | 11/2024 | Watanabe | G03G 21/0017 |
| 2014/0086624 | A1 * | 3/2014 | Kojima | G03G 21/0017 399/350 |
| 2017/0068206 | A1 * | 3/2017 | Tano | G03G 21/1814 |
| 2023/0152734 | A1 * | 5/2023 | Sugiura | G03G 15/161 399/101 |

FOREIGN PATENT DOCUMENTS

| | | |
|---|---|---|
| JP | 2010-209200 A | 9/2010 |
| JP | 2016-014740 A | 1/2016 |
| JP | 2017-049558 A | 3/2017 |

* cited by examiner

*Primary Examiner* — Stephanie E Bloss
*Assistant Examiner* — Michael A Harrison
(74) *Attorney, Agent, or Firm* — Oliff PLC

(57) ABSTRACT

A belt cleaning blade has a contact part that is brought into contact with at least a surface of a belt which is a member to be cleaned, in which the contact part is configured of polyurethane rubber containing a hard segment and a soft segment, and in a surface of the contact part, a proportion $H_X$ occupied by domains of the hard segment is 15.2% or more and 26.1% or less, and a proportion $H_Y$ occupied by an area of the domains of the hard segment having an area of 200 $nm^2$ or more and 1,000 $nm^2$ or less to a total area of the domains of the hard segment in the surface is 38.9% or more and 60.8% or less.

20 Claims, 2 Drawing Sheets

BELT CLEANING BLADE, IMAGE FORMING APPARATUS, AND TRANSFER DEVICE

CROSS-REFERENCE TO RELATED APPLICATIONS

This application is based on and claims priority under 35 USC 119 from Japanese Patent Application No. 2023-140514 filed Aug. 30, 2023.

BACKGROUND

(i) Technical Field

The present disclosure relates to a belt cleaning blade, an image forming apparatus, and a transfer device.

(ii) Related Art

In an image forming apparatus (such as a copy machine, a facsimile machine, or a printer) using an electrophotographic method, sometimes a cleaning blade is used for cleaning the adhered toner.

For example, JP2016-14740A describes a cleaning blade having a contact part that comes into contact with at least a member to be cleaned and is configured with a polyurethane member containing a polyurethane material containing a hard segment and a soft segment, in which a proportion of an area of a hard segment aggregate having a diameter in a range of 0.3 μm or more and 0.7 μm or less is 2% or more and 10% or less in a cross section of the polyurethane member.

JP2017-49558A describes a cleaning blade having a contact part that comes into contact with at least a member to be cleaned and is configured with a polyurethane member containing polyurethane containing a hard segment component and a soft segment component, in which a domain particle size of the hard segment component is 45 nm or more and 100 nm or less.

SUMMARY

Aspects of non-limiting embodiments of the present disclosure relate to a belt cleaning blade that has a contact part being brought into contact with at least a surface of a belt which is a member to be cleaned, in which the contact part is configured of polyurethane rubber containing a hard segment and a soft segment, and the belt cleaning blade has higher abrasion resistance and higher chipping resistance with compared to a case where in a surface of the contact part, a proportion $H_X$ occupied by the domains of the hard segment is less than 15.2% or more than 26.1%, or with respect to a total area of the domains of the hard segment in the surface, a proportion $H_Y$ occupied by an area of the domains of the hard segment having an area of 200 $nm^2$ or more and 1,000 $nm^2$ or less is less than 38.9% or more than 60.8%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above object include the following aspect.

According to an aspect of the present disclosure, there is provided a belt cleaning blade having a contact part that is brought into contact with at least a surface of a belt which is a member to be cleaned, in which the contact part is configured of polyurethane rubber containing a hard segment and a soft segment, and in a surface of the contact part, a proportion $H_X$ occupied by domains of the hard segment is 15.2% or more and 26.1% or less, and a proportion $H_Y$ occupied by an area of the domains of the hard segment having an area of 200 $nm^2$ or more and 1,000 $nm^2$ or less to a total area of the domains of the hard segment in the surface is 38.9% or more and 60.8% or less.

BRIEF DESCRIPTION OF THE DRAWINGS

Exemplary embodiment(s) of the present invention will be described in detail based on the following figures, wherein.

DETAILED DESCRIPTION

Figure 1:
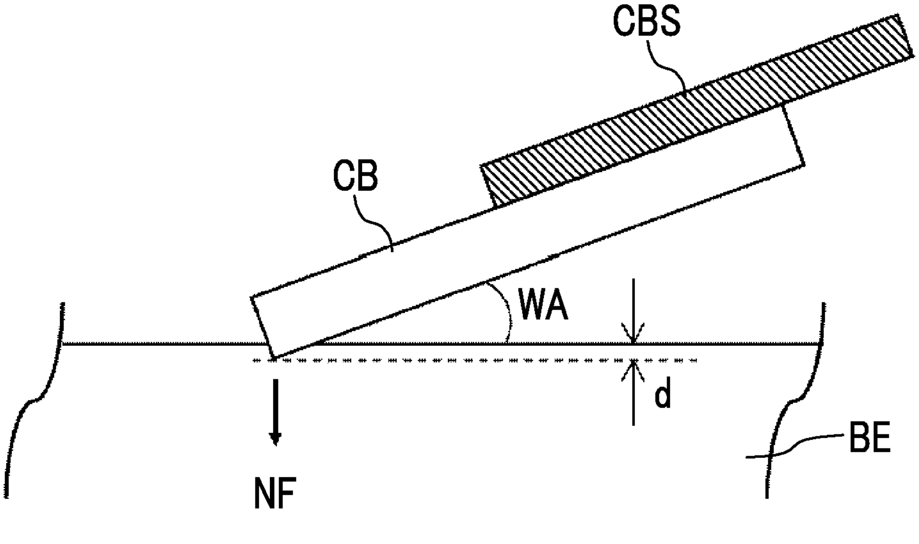
FIG. 1 is a schematic view illustrating a condition of contact between a belt and a belt cleaning blade according to the present exemplary embodiment.

Hereinafter, the present exemplary embodiment as an example of the present invention will be described. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value of a range of numerical values may be replaced with the upper limit or lower limit of another range of numerical values described in stages. In addition, regarding the ranges of numerical values described in the present exemplary embodiment, the upper limit value or lower limit value of a range of numerical values may be replaced with values described in examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Belt Cleaning Blade

A belt cleaning blade according to the present exemplary embodiment has a contact part that is brought into contact with at least a surface of a belt which is a member to be cleaned, in which the contact part is configured of polyurethane rubber containing a hard segment and a soft segment, and in a surface of the contact part, a proportion $H_X$ occupied by domains of the hard segment is 15.2% or more and 26.1% or less, or a proportion $H_Y$ occupied by an area of the domain of the hard segment having an area of 200 $nm^2$ or more and 1,000 $nm^2$ or less to a total area of the domain of the hard segment of the surface is 38.9% or more and 60.8% or less.

The belt cleaning blade is a cleaning blade that comes into contact with a surface of a belt as a member to be cleaned and is used for cleaning the surface of the belt. By the belt cleaning blade, a toner (such as toner particles or external additives), products of discharge, paper dust, and the like that adhere to or remain on the surface of the belt are removed, and the surface of the belt is cleaned.

Being configured with the aforementioned contact part, the belt cleaning blade according to the present exemplary embodiment has excellent abrasion resistance and excellent chipping resistance. The reason is presumed as follows.

A photoreceptor is an example of a member that is in an image forming apparatus and undergoes surface cleaning with a cleaning blade. In a case where the photoreceptor is cleaned with a cleaning blade, it is possible to remove the deposits on the surface while scraping the surface of the photoreceptor.

Meanwhile, the surface of a belt such as an intermediate transfer belt often has extremely high abrasion resistance. In this case, even being cleaned with a cleaning blade, the surface is unlikely to be scraped off, and the deposits on the surface of the belt remain in many cases. As a result, the belt cleaning blade tends to advance in wear.

Therefore, for the belt cleaning blade, it is desired to increase the hardness of the contact part with a belt, such that the abrasion resistance is improved. However, in a case where the hardness is increased to improve the abrasion resistance, sometimes the contact part with a belt is chipped.

In the belt cleaning blade according to the present exemplary embodiment, first, the contact part with the surface of a belt is configured of polyurethane rubber containing a hard segment and a soft segment. Furthermore, in a surface of the contact part, an abundance proportion (the proportion $H_X$ described above) of the domain of the hard segment and an abundance proportion (the proportion $H_Y$ described above) of the domain of the hard segment having a specific area to all domains are each set to fall into a specific range.

In a contact part having such a surface, the domains of the hard segment harder than the soft segment can be abundantly existed, which increases the hardness and improves the abrasion resistance. Furthermore, because there is a difference in elongation rate between the domain of the hard segment and the soft segment, sometimes cracks occur at the interface between the segments, which lead to chipping. However, presumably, in a case where the above configuration is adopted, the contact site may include domains of the hard segment that are not too large and have an appropriate size, and the distance between domains of the hard segment will not be too short, which could suppress the occurrence of cracks at the interface between the domains of the hard segment and the soft segment and effectively suppress chipping of the contact part.

Contact Part of Belt Cleaning Blade

The contact part of the belt cleaning blade is a contact part with the surface of a belt, and is configured of polyurethane rubber containing a hard segment and a soft segment.

In a surface of the contact part, a proportion $H_X$ occupied by domains of the hard segment is 15.2% or more and 26.1% or less, or a proportion $H_Y$ occupied by an area of the domain of the hard segment having an area of 200 $nm^2$ or more and 1,000 $nm^2$ or less to a total area of the domain of the hard segment of the surface is 38.9% or more and 60.8% or less.

"Domain of the hard segment" refers to an aggregate formed by the aggregation of hard segment of the polyurethane rubber.

Proportion $H_X$

In a surface of the contact part, a proportion $H_X$ occupied by the domains of the hard segment is 15.2% or more and 26.1% or less. The proportion $H_X$ refers to a proportion of the total area of the domains of the hard segment to the total area of the surface of the contact part.

From the viewpoint of improving abrasion resistance, the proportion $H_X$ is, for example, preferably 18.4% or more, and more preferably 19.0% or more.

From the viewpoint of improving chipping resistance, the proportion $H_X$ is, for example, preferably 25.3% or less, and more preferably 24.8% or less.

From the above, from the viewpoint of further improving abrasion resistance and chipping resistance, the proportion $H_X$ is, for example, preferably 18.4% or more and 25.3% or less, and more preferably 19.0% or more and 24.8% or less.

Proportion $H_Y$

In a surface of the contact part, a proportion $H_Y$ of an area of domains of the hard segment having an area of 200 $nm^2$ or more and 1,000 $nm^2$ or less to a total area of the domains of the hard segment in the surface is 38.9% or more and 60.8% or less. The proportion $H_Y$ refers to a proportion of the total area of domains of the hard segment having an area of 200 $nm^2$ or more and 1,000 $nm^2$ or less to the total area of domains of the hard segment in the surface.

From the viewpoint of improving chipping resistance, the proportion $H_Y$ is, for example, preferably 59.2% or less, and more preferably 58.5% or less.

In addition, from the viewpoint of improving abrasion resistance, the proportion $H_Y$ is, for example, preferably 39.9% or more, and more preferably 44.4% or more.

From the above, from the viewpoint of further improving abrasion resistance and chipping resistance, the proportion $H_Y$ is, for example, preferably 39.9% or more and 59.2% or less, and more preferably 44.4% or more and 58.5% or less.

In the present exemplary embodiment, from a viewpoint of further improving abrasion resistance and chipping resistance, it is preferable that for example, the proportion $H_Y$ is 18.4% or more and 25.3% or less and the proportion $H_Y$ is 39.9% or more and 59.2% or less.

Proportion $H_Z$

In a surface of the contact part, a proportion $H_Z$ of the number of domains of the hard segment having an area of 200 $nm^2$ or more and 1,000 $nm^2$ or less to a total number of the domains of the hard segment in the surface is, for example, preferably 31.2% or more and 48.7% or less. The proportion $H_Z$ refers to a proportion of the total number of domains of the hard segment having an area of 200 $nm^2$ or more and 1,000 $nm^2$ or less to the total number of domains of the hard segment in the surface.

From the viewpoint of improving abrasion resistance, the proportion $H_Z$ is, for example, more preferably 33.7% or more, and even more preferably 35.0% or more.

In addition, from the viewpoint of improving chipping resistance, the proportion $H_Z$ is, for example, more preferably 47.9% or less, and even more preferably 47.6% or less.

From the above, from the viewpoint of further improving abrasion resistance and chipping resistance, the proportion $H_Z$ is, for example, more preferably 33.7% or more and 47.9% or less, and even more preferably 35.0% or more and 47.6% or less.

In addition, in the belt cleaning blade according to the present exemplary embodiment, from the viewpoints of maintaining followability due to deformation of the entire contact part of the blade and further improving abrasion resistance and chipping resistance, in a case where, in a cross section of the contact part, the proportion occupied by the domain of the hard segment to the total area of the cross section is defined as $D_X$, and the proportion occupied by the area of the domain of the hard segment having an area of 200 $nm^2$ or more and 1000 nm 2 or less to the total area of the domain of the hard segment in the cross section is defined as $D_Y$, it is preferable that for example, the ratio of the proportion $D_X$ to the proportion $H_X$ is 0.58 or more and 1.64 or less, and the ratio of the proportion $D_Y$ to the proportion $H_Y$ is 0.29 or more and 1.19 or less.

The ratio of the proportion $D_X$ to the proportion $H_X$ is, for example, more preferably 0.60 or more and 1.36 or less, and even more preferably 0.61 or more and 1.32 or less. In addition, the ratio of the proportion $D_Y$ to the proportion $H_Y$ is, for example, more preferably 0.30 or more and 1.16 or less, and even more preferably 0.30 or more and 1.05 or less.

The proportion $D_X$ refers to a proportion of the total area of the domains of the hard segment to the total area of the cross section.

The proportion $D_X$ may be a value that satisfies the ratio of the proportion $D_X$ to the proportion $H_X$ described above. The proportion $D_X$ is, for example, preferably 14.9% or more and 25.1% or less, more preferably 16.0% or more and 24.0% or less, and even more preferably 18.0% or more and 23.5% or less.

The proportion $D_Y$ refers to a proportion of the total area of domains of the hard segment having an area of 200 $nm^2$ or more and 1,000 $nm^2$ or less to the total area of domains of the hard segment in the cross section.

The proportion $D_Y$ may be a value that satisfies the ratio of the proportion $D_Y$ to the proportion $H_Y$ described above. The proportion $D_Y$ is, for example, preferably 17.8% or more and 46.5% or less, more preferably 18.0% or more and 45.0% or less, and even more preferably 19.0% or more and 44.0% or less.

Furthermore, in the cross section of the contact part of the belt cleaning blade according to the present exemplary embodiment, in a case where a proportion of the number of the domains of the hard segment having an area of 200 $nm^2$ or more and 1,000 $nm^2$ or less to a total number of the domains of the hard segment is defined as $D_Z$, for example, the ratio of the proportion $D_Z$ to the proportion $H_Z$ is preferably 0.04 or more and 0.34 or less.

The ratio of the proportion $D_Z$ to the proportion $H_Z$ is, for example, more preferably 0.04 or more and 0.32 or less, and even more preferably 0.04 or more and 0.30 or less.

The proportion $D_Z$ refers to a proportion of the total number of domains of the hard segment having an area of 200 $nm^2$ or more and 1,000 $nm^2$ or less to the total number of domains of the hard segment in the cross section.

The proportion $D_Z$ may be a value that satisfies the ratio of the proportion $D_Z$ to the proportion $H_Z$ described above. The proportion $D_Z$ is, for example, preferably 2.2% or more and 11.1% or less, more preferably 3.5% or more and 10.8% or less, and even more preferably 5.0% or more and 10.5% or less.

The above-described proportion $H_X$, proportion $H_Y$, proportion $H_Z$, proportion $D_X$, proportion $D_Y$, and proportion $D_Z$ are determined by an atomic force microscope (AFM) of the surface or the cross section of the contact part.

Specifically, in a case where the proportion $H_X$, the proportion $H_Y$, and the proportion $H_Z$ are determined, an image of a 500 nm square in the surface of the contact part is obtained in five visual fields using AFM (AFM5000II manufactured by Hitachi High-Tech Corporation). Otsu's binarization is performed on the obtained images by using image processing software, such that the domains of hard segment appear black and the domains of soft segment appear white. From the binarized image, the total area of the surface, the total area of domains of hard segment, the area of domains of hard segment having an area of 200 $nm^2$ or more and 1,000 $nm^2$ or less, the total number of domains of hard segment, the total number of domains of hard segment having an area of 200 $nm^2$ or more and 1,000 $nm^2$ or less, and diameters of the domains of hard segment are measured.

In addition, in a case where the proportion $D_X$, the proportion $D_Y$, and the proportion $D_Z$ are determined, an arbitrary cross section of the contact part configured of polyurethane rubber (provided that a portion separated from the surface by about 1 mm) is obtained by the cryo-microtome method, and an image of a 500 nm square in the cross section of the contact part is obtained in five visual fields using AFM (AFM5000II manufactured by Hitachi High-Tech Corporation). Otsu's binarization is performed on the obtained images by using image processing software, such that the domains of hard segment appear black and the domains of soft segment appear white. From the binarized image, the total area of the cross section, the total area of domains of hard segment, the area of domains of hard segment having an area of 200 $nm^2$ or more and 1,000 $nm^2$ or less, the total number of domains of hard segment, the total number of domains of hard segment having an area of 200 $nm^2$ or more and 1,000 $nm^2$ or less, and diameters of the domains of hard segment are measured.

The above-described proportion $H_X$, proportion $H_Y$, proportion $H_Z$, proportion $D_X$, proportion $D_Y$, and proportion $D_Z$ are all adjusted by, in the polyurethane rubber, the amounts of the hard segment, the degree of aggregation of the hard segment, the degree of the surface treatment.

In particular, the proportion $H_X$, the proportion $H_Y$, and the proportion $H_Z$, which indicate the surface properties at the contact part, are adjusted under various conditions in the surface treatment (for example, a treatment for forming an impregnated cured layer using an isocyanate compound described later).

The specific method is not particularly limited, and in a case where for example, in a treatment for forming an impregnated cured layer using an isocyanate compound, the impregnation treatment time for the isocyanate compound is lengthened, both of the proportion $H_X$, the proportion $H_Y$, and the proportion $H_Z$ can be increased.

Next, the configurations of the belt cleaning blade according to the present exemplary embodiment will be specifically described.

Layer Configuration

Both the belt cleaning blades according to the present exemplary embodiment may be configured, for example, with a single layer, two layers, or three or more layers, or may have other configurations.

Examples of the cleaning blade configured with a single layer include a cleaning blade configured with a single material as a whole including the contact part which is brought into contact with a belt (that is, a cleaning blade consisting of a contact part configured with the aforementioned polyurethane rubber).

Examples of the cleaning blade configured with two layers include a cleaning blade provided with a first layer including a contact part which is brought into contact with a belt and a second layer (also called a non-contact part) as a back surface layer that is formed on the back surface side of the first layer and consists of a material different from the contact part. Examples of the cleaning blade configured with three or more layers include a cleaning blade having another layer (this layer is also called a non-contact part) between the first layer and the second layer in the aforementioned cleaning blade configured with two layers.

The cleaning blade is used, for example, by being supported by a rigid plate-shaped support member.

Polyurethane Constituting Contact Part

As described above, the contact part is configured of polyurethane rubber.

The polyurethane rubber can be obtained by polymerizing at least a polyol component and a polyisocyanate component. As necessary, the polyurethane rubber may be obtained by polymerizing a resin having a functional group capable of reacting with an isocyanate group in the polyisocyanate component, in addition to the polyol component.

The polyurethane rubber constituting the contact part contains a hard segment and a soft segment. In the polyurethane rubber, "hard segment" means a segment that consists of a material relatively harder than a material constituting "soft segment", and "soft segment" means a segment that consists of a material relatively softer than the material constituting "hard segment".

Examples of the material constituting the hard segment (hard segment material) include a low-molecular-weight polyol among polyol components, a resin having a functional group capable of reacting with an isocyanate group in the polyisocyanate component, and the like. On the other hand, examples of the material constituting the soft segment (soft segment material) include a high-molecular-weight polyol among polyol components.

Polyol Component

The polyol component contains a high-molecular-weight polyol and a low-molecular-weight polyol.

The high-molecular-weight polyol is a polyol having a number-average molecular weight of 500 or more (for example, preferably 500 or more and 5,000 or less).

Examples of the high-molecular-weight polyol include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol.

Examples of commercially available products of high-molecular-weight polyols include PLACCEL 205 PLACCEL 240 manufactured by Daicel Corporation, and the like.

Here, the number-average molecular weight is a value measured by a gel permeation chromatography (GPC) method. The same applies hereinafter.

One high-molecular-weight polyol may be used alone, or two or more high-molecular-weight polyols may be used in combination.

The polymerization ratio of the high-molecular-weight polyol to all the polymerization components of the polyurethane rubber may be, for example, 30 mol % or more and 50 mol % or less, and is preferably 40 mol % or more and 50 mol % or less.

The low-molecular-weight polyol is a polyol having a molecular weight (or a number-average molecular weight) of less than 500. The low-molecular-weight polyol is also a material that functions as a chain extender and a crosslinking agent.

Examples of the low-molecular-weight polyol include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanedecanediol. Among these, for example, 1,4-butanediol is preferably employed as the low-molecular-weight polyol.

Examples of the low-molecular-weight polyol also include polyols such as a diol (difunctional), a triol (trifunctional), and a tetraol (tetrafunctional) which are known as chain extenders and crosslinking agents.

One low-molecular-weight polyol may be used alone, or two or more low-molecular-weight polyols may be used in combination.

The polymerization ratio of the low-molecular-weight polyol to all the polymerization components of the polyurethane rubber may be, for example, more than 50 mol % and 75 mol % or less, preferably 52 mol % or more and 75 mol % or less, more preferably 55 mol % or more and 75 mol % or less, and even more preferably 55 mol % or more and 60 mol % or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3'-dimethylbiphenyl-4,4'-diisocyanate (TODI).

Among these, as the polyisocyanate component, for example, 4,4'-diphenylmethane diisocyanate (MDI), 1,5-naphthalene diisocyanate (NDI), and hexamethylene diisocyanate (HDI) are more preferable.

One polyisocyanate component may be used alone, or two or more polyisocyanate components may be used in combination.

The polymerization ratio of the polyisocyanate component to all the polymerization components of the polyurethane rubber may be, for example, 5 mol % or more and 25 mol % or less, and preferably 10 mol % or more and 20 mol % or less.

Resin Having Functional Group Capable of Reacting with Isocyanate Group

As the resin having a functional group capable of reacting with an isocyanate group (hereinafter, also called "reactive group-containing resin"), for example, a flexible resin is preferable, and an aliphatic resin having a linear structure is more preferable in view of flexibility. Specific examples of the reactive group-containing resin include an acrylic resin containing two or more hydroxyl groups, a polybutadiene resin containing two or more hydroxyl groups, an epoxy resin having two or more epoxy groups, and the like.

Examples of commercially available products of acrylic resins containing two or more hydroxyl groups include ACTFLOW manufactured by Soken Chemical & Engineering Co., Ltd. (grades: UMB-2005B, UMB-2005P, UMB-2005, UME-2005, and the like).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (also called a flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In addition, in terms of the physical properties, compared to the epoxy resin of the related art, for example, an epoxy resin having a low viscosity relative to the molecular weight is preferable. Specifically, for example, the weight-average molecular weight is in a range of 900±100 and the viscosity at 25° C. is desirably in a range of 15,000±5,000 mPa's and more desirably in a range of 15,000±3,000 mPa s. Examples of commercially available products of epoxy resins having such characteristics include EPICLON EXA-4850-150 manufactured by DIC Corporation.

One reactive group-containing resin may be used alone, or two or more reactive group-containing resins may be used in combination.

Manufacturing Method of Polyurethane Rubber

The polyurethane rubber may be manufactured using raw materials for manufacturing polyurethane rubber including the polyol component and polyisocyanate component described above and, as necessary, a resin having a functional group capable of reacting with a reactive isocyanate group, by a general manufacturing method of polyurethane such as a prepolymer method or a one-shot method. With the prepolymer method, polyurethane rubber having excellent abrasion resistance and excellent chipping resistance is obtained. Therefore, this method is suited for the present exemplary embodiment, but the present exemplary embodiment is not limited by the manufacturing method.

For manufacturing the polyurethane rubber, for example, a catalyst is preferably used.

Examples of catalysts used for manufacturing the polyurethane rubber include an amine-based compound such as a tertiary amine, a quaternary ammonium salt, and an organometallic compound such as an organotin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine) adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo [4.3.0]nonen-5 (DBN) octylate, 1,8-diazabicyclo [5.4.0]undec-7 (DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, in view of hydrolysis resistance, triethylenediamine (TEDA), which is a tertiary ammonium salt, is used. Furthermore, in view of processability, a quaternary ammonium salt is used. Among the quaternary ammonium salts, 1,5-diazabicyclo [4.3.0]nonen-5 (DBN) octylate, 1,8-diazabicyclo [5.4.0]undec-7 (DBU)-octylate, or DBU-formate with high reaction activity is used.

One catalyst may be used alone, or two or more of catalysts may be used in combination.

The content of the catalyst with respect to the total mass of the polyurethane rubber is, for example, preferably in a range of 0.0005% by mass or more and 0.03% by mass or less, and particularly preferably 0.001% by mass or more and 0.01% by mass or less.

Impregnated Cured Layer

It is preferable that the polyurethane rubber constituting the contact part have, as a surface layer, for example, an impregnated cured layer of an isocyanate compound.

The impregnated cured layer enhances the hardness of the contact part, which makes it possible to further improve abrasion resistance and chipping resistance.

The surface layer of the polyurethane rubber constituting the contact part means a region at a depth of 200 μm from the surface of the contact part.

The impregnated cured layer is obtained by modifying the polyurethane rubber configuring the contact part.

Specifically, the impregnated cured layer is a layer obtained by impregnating the surface layer of the contact part configured of the polyurethane rubber with a surface treatment liquid containing an isocyanate compound and an organic solvent, and curing the surface treatment liquid (that is, the isocyanate compound) with which the surface layer is impregnated.

The impregnated cured layer is formed as a layer integrated with the surface layer of the contact part such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethylbiphenyl-4,4'-diisocyanate (TODI), and multimers and modification products of these.

In the present exemplary embodiment, in order to adjust the proportion $H_X$, the proportion $H_Y$, and the proportion $H_Z$ to the above-described ranges, for example, changing the degree of polymerization of 4,4'-diphenylmethane diisocyanate (MDI), changing of the impregnation treatment time, changing of the impregnation treatment temperature, and the like.

The surface layer of the polyurethane rubber constituting the contact part may have a layer impregnated with diamond-like carbon. Furthermore, a diamond-like carbon layer may be provided on the surface of the polyurethane rubber constituting the contact part.

Physical Properties of Contact Part

From the viewpoint of excellent abrasion resistance and excellent chipping resistance, the Young's modulus of the polyurethane rubber configuring the contact part is, for example, preferably 3 MPa or more and 25 MPa or less, more preferably 5 MPa or more and 22 MPa or less, and even more preferably 10 MPa or more and 20 MPa or less.

The Young's modulus is measured as follows.

The Young's modulus is measured using a nanoindentation method. Specifically, by using PICODENTOR HM500 manufactured by Fischer Instrumentation and a Berkovich diamond indenter, an indentation depth-loading curve is drawn. Then, an unloading curve is drawn by applying load so that the maximum indentation depth reaches 1,000 nm and then removing the load, and the slope of the unloading curve is calculated as the Young's modulus.

From the viewpoint of excellent abrasion resistance and excellent chipping resistance, the hardness of the polyurethane rubber constituting the contact part is, for example, preferably 60 or more and 98 or less, more preferably 65 or more and 97 or less, and even more preferably 70 or more and 95 or less.

The aforementioned hardness is micro rubber hardness. The micro rubber hardness is measured based on the micro hardness MD-1 test method by using a micro rubber hardness tester MD-1 type (polymer A type) manufactured by KOBUNSHI KEIKI CO., LTD.

Molding of Contact Part

The contact part (that is, the aforementioned contact part) configured with the polyurethane rubber is produced by molding a composition for molding a cleaning blade containing the polyurethane rubber or prepolymer obtained by the method described above in the form of a sheet by using, for example, centrifugal molding, extrusion molding, or the like, and processing the molded resultant by cutting or the like.

The contact part is obtained by molding the composition for molding a cleaning blade. Therefore, the contact part may be configured of the polyurethane rubber as a main component as well as additives used for obtaining the polyurethane rubber, a filler used as necessary, and the like.

Manufacture of Cleaning Blade

The cleaning blade configured with a single layer is manufactured, for example, by the molding method of the contact part described above.

The cleaning blade configured with two layers and the cleaning blade configured with three or more layers are produced, for example, by bonding a first layer as a contact part and a second layer as a non-contact part (a plurality of layers in a case where the cleaning blade is configured with three or more layers) to each other. As the bonding method, double-sided tape, various adhesives, and the like are used. In addition, during molding, materials of the respective layers may be poured into a mold with variations in time and allowed to be bonded to each other without providing an adhesive layer, such that a plurality of layers stick together.

Configuration of Non-Contact Part

What will be described below is the composition of a non-contact part of a cleaning blade that has a contact part and a non-contact part, such as the aforementioned second layer and other layers, configured with different materials.

Any of known materials can be used for the non-contact part without limitations, as long as the non-contact part has a function of supporting the contact part. Specifically, examples of the material used for the non-contact part include polyurethane rubber, silicon rubber, fluororubber, chloroprene rubber, butadiene rubber, and the like. Among these, for example, polyurethane rubber may be used. Examples of the polyurethane rubber include ester-based polyurethane and ether-based polyurethane. Among these, for example, ester-based polyurethane is particularly desirable.

Condition of Contact with Belt

By coming into contact with the surface of a belt which is a member to be cleaned, the belt cleaning blade according to the present exemplary embodiment cleans the surface of the belt.

The condition of the contact between the belt and the belt cleaning blade will be described using FIG. 1.

FIG. 1 is a schematic view illustrating a condition of contact between a belt and the belt cleaning blade. In FIG. 1, BE represents an intermediate transfer belt (an example of a belt), CB represents the belt cleaning blade, and CBS represents the support member that supports the cleaning blade.

From the viewpoint of obtaining excellent cleanliness, a pressing force NF shown in FIG. 1 that is for pressing the belt cleaning blade CB on the belt BE is, for example, preferably 0.05 N·m or more and 5 N·m or less, and more preferably 0.1 Nom or more and 3 N·m or less. The intrusion d of the belt cleaning blade CB into the belt BE is, for example, preferably 0 mm or more and 10 mm or less, and more preferably 0.01 mm or more and 5 mm or less.

An angle WA (working angle) at the contact portion between the belt BE and the belt cleaning blade CB is, for example, preferably 3° or more and 35° or less, and more preferably 5° or more and 30° or less.

The pressing force NF of the cleaning blade is calculated by the following formula.

$$\text{Pressing force } NF = k \times d \qquad \text{Formula}$$

In the formula, k represents a spring constant unique to the cleaning blade, and d represents an intrusion of the cleaning blade into the belt (see FIG. 1).

The spring constant k unique to the cleaning blade is obtained by causing displacement of the cleaning blade and measuring the load with a load cell.

The intrusion d of the cleaning blade into the belt is determined by calculating the amount of displacement of the blade caused in a case where the cleaning blade fixed to the support member is brought into contact with the belt.

Member to Be Cleaned

Examples of the belt as a member to be cleaned by the belt cleaning blade according to the present exemplary embodiment include an intermediate transfer belt, a secondary transfer belt, a paper transport belt, and the like used in an image forming apparatus. Among these, from the viewpoint of obtaining excellent cleanliness by combining with the belt cleaning blade according to the present exemplary embodiment, for example, an intermediate transfer belt is preferable as a member to be cleaned.

Intermediate Transfer Belt

Hereinafter, for example, a secondary transfer belt suited as a member to be cleaned will be described.

Layer Configuration

Examples of the intermediate transfer belt include a single layer of a polyimide-based resin layer or a laminate having a polyimide-based resin layer as the outermost surface layer.

That is, for example, the outer peripheral surface of the intermediate transfer belt may be configured with a polyimide-based resin layer.

In a case where the intermediate transfer belt is configured with a laminate having a polyimide-based resin layer as the outermost surface layer, the intermediate transfer belt in which the polyimide-based resin layer is provided on a resin base material layer is adopted. An interlayer (such as an elastic layer) may be provided between the base material layer and the polyimide-based resin layer.

As the resin base material layer and the interlayer (such as an elastic layer), known layers adopted for intermediate transfer belts are used.

Configuration of Polyimide-Based Resin Layer

The polyimide-based resin layer contains, for example, a polyimide-based resin and conductive carbon particles. The polyimide-based resin layer preferably contains, for example, a release agent.

As necessary, the polyimide-based resin layer may contain other known components.

The polyimide-based resin layer is a layer containing a polyimide-based resin as a component having the greatest mass among the components configuring the resin layer.

Polyimide-Based Resin

The polyimide-based resin means a resin containing a constitutional unit having an imide bond.

Examples of the polyimide-based resin include a polyimide resin, a polyamide-imide resin, and a polyetherimide resin.

From the viewpoint of cleanliness maintainability, as the polyimide-based resin, among the above, for example, a polyimide resin and a polyamide-imide resin are preferable, and a polyimide resin is more preferable.

Examples of the polyimide resin include an imidized polyamic acid (polyimide resin precursor) which is a polymer of a tetracarboxylic dianhydride and a diamine compound.

Examples of the polyimide resin include a resin having a constitutional unit represented by General Formula (I).

General Formula (I)

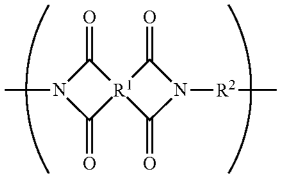

In General Formula (I), $R^1$ represents a tetravalent organic group, and $R^2$ represents a divalent organic group.

Examples of the tetravalent organic group represented by $R^1$ include an aromatic group, an aliphatic group, a cyclic aliphatic group, a group obtained by combining an aromatic group and an aliphatic group, and a group obtained by the substitution of these. Specific examples of the tetravalent organic group include a residue of a tetracarboxylic dianhydride which will be described later.

Examples of the divalent organic group represented by $R^2$ include an aromatic group, an aliphatic group, a cyclic aliphatic group, a group obtained by combining an aromatic group and an aliphatic group, and a group obtained by the substitution of these. Specific examples of the divalent organic group include a residue of a diamine compound which will be described later.

Specifically, examples of the tetracarboxylic dianhydride used as a raw material of the polyimide resin include a pyromellitic dianhydride, a 3,3',4,4'-benzophenone tetracarboxylic dianhydride, a 3,3',4,4'-biphenyltetracarboxylic dianhydride, a 2,3,3',4-biphenyltetracarboxylic dianhydride, a 2,3,6,7-naphthalenetetracarboxylic dianhydride, a 1,2,5,6-naphthalenetetracarboxylic dianhydride, a 1,4,5,8-naphthalenetetracarboxylic dianhydride, a 2,2'-bis(3,4-dicarboxyphenyl) sulfonic dianhydride, a perylene-3,4,9,10-Tetracarboxylic dianhydride, a bis(3,4-dicarboxyphenyl) ether dianhydride, and an ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenylsulfide, 3,3'-diaminodiphenylsulfone, 1,5-diaminonaphthalene, m-phenylenediamine, p-phenylenediamine, 3,3'-dimethyl 4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino tert-butyl)toluene, bis(p-β-amino-tert-butylphenyl)ether, bis(p-β-methyl-8-aminophenyl) benzene, bis-p-(1,1-dimethyl-5-amino-pentyl)benzene, 1-isopropyl-2,4-m-phenylenediamine, m-xylylene diamine, p-xylylene diamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4'-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis [4-(4-aminophenoxy)phenyl]propane, piperazine, $H_2N(CH_2)_3O(CH_2)_2O(CH_2)NH_2$, $H_2N(CH_2)_3S(CH_2)_3NH_2$, $H_2N(CH_2)_3N(CH_3)_2(CH_2)_3NH_2$, and the like.

Examples of the polyamide-imide resin include a resin having an imide bond and an amide bond in a repeating unit.

More specifically, examples of the polyamide-imide resin include a polymer of a trivalent carboxylic acid compound (also called a tricarboxylic acid) having an acid anhydride group and a diisocyanate compound or a diamine compound.

As the tricarboxylic acid, for example, a trimellitic acid anhydride and a derivative thereof preferable. In addition to the tricarboxylic acid, a tetracarboxylic dianhydride, an aliphatic dicarboxylic acid, an aromatic dicarboxylic acid, or the like may also be used.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include a compound that has the same structure as the aforementioned isocyanate and has an amino group instead of an isocyanato group.

From the viewpoint of mechanical strength, volume resistivity adjustment, and the like, the content of the polyimide-based resin with respect to the polyimide-based resin layer is, for example, preferably 60% by mass or more and 95% by mass or less, more preferably 70% by mass or more and 95% by mass or less, and even more preferably 75% by mass or more and 90% by mass or less.

Conductive Carbon Particles

Examples of the conductive carbon particles include carbon black.

Examples of the carbon black include Ketjen black, oil furnace black, channel black, and acetylene black. As the carbon black, carbon black having undergone a surface treatment (hereinafter, also called "surface-treated carbon black") may be used.

The surface-treated carbon black is obtained by adding, for example, a carboxy group, a quinone group, a lactone group, or a hydroxy group to the surface of carbon black. Examples of the surface treatment method include an air oxidation method of reacting carbon black by bringing the carbon black into contact with air in a high temperature atmosphere, a method of reacting carbon black with nitrogen oxide or ozone at room temperature (for example, 22° C.), and a method of oxidizing carbon black with air in a high temperature atmosphere and then with ozone at a low temperature.

From the viewpoint of dispersibility, mechanical strength, volume resistivity, film forming properties, and the like, the average particle size of the conductive carbon particles is, for example, preferably 2 nm or more and 40 nm or less, more preferably 8 nm or more and 20 nm or less, and even more preferably 10 nm or more and 15 nm or less.

The average particle size of the conductive carbon particles is measured by the following method.

First, by a microtome, a measurement sample having a thickness of 100 nm is collected from the polyimide-based resin layer and observed with a transmission electron microscope (TEM). Then, the diameters of circles each having an area equivalent to the projected area of each of 50 conductive carbon particles (that is, equivalent circle diameters) are adopted as particle sizes, and the average thereof are adopted as the average particle size.

From the viewpoint of mechanical strength and volume resistivity, the content of the conductive carbon particles is, for example, preferably 10% by mass or more and 50% by mass or less with respect to the polyimide-based resin layer.

Other Components

Examples of other components include a conducting agent other than conductive carbon particles, a filler for improving mechanical strength, an antioxidant for preventing thermal deterioration of a belt, a surfactant for improving fluidity, a heat-resistant antioxidant, and a release agent.

In a case where the polyimide-based resin layer contains other components, the content of the other components with respect to the polyimide-based resin layer is, for example, preferably more than 0% by mass and 10% by mass or less, more preferably more than 0% by mass and 5% by mass or less, and even more preferably more than 0% by mass and 1% by mass or less.

Thickness of Polyimide-Based Resin Layer

In a case where the intermediate transfer belt is configured with a single polyimide-based resin layer, from the viewpoint of mechanical strength, the thickness of the polyimide-based resin layer is, for example, preferably 60 μm or more and 120 μm or less, and more preferably 80 μm or more and 120 μm or less.

In a case where the intermediate transfer belt is configured with a laminate having the polyimide-based resin layer as the outermost surface layer, from the viewpoint of manufacturing suitability and from the viewpoint of suppressing discharge, the thickness of the polyimide-based resin layer is, for example, preferably 1 μm or more and 60 μm or less, and more preferably 3 μm or more and 60 μm or less.

The thickness of the polyimide-based resin layer is measured as follows.

That is, a cross section of the polyimide-based resin layer taken along the thickness direction is observed with an optical microscope or a scanning electron microscope, the thickness of the layer as a measurement target is measured at 10 sites, and the average thereof is adopted as the thickness.

Surface Roughness of Outer Peripheral Surface of Intermediate Transfer Belt

From the viewpoint of improving cleanliness of the belt cleaning blade according to the present exemplary embodiment, a surface roughness Rz of the outer peripheral surface of the intermediate transfer belt is, for example, preferably 0.001 μm or more and 1 μm or less, more preferably 0.005 μm or more and 0.5 μm or less, and even more preferably 0.01 μm or more and 0.3 μm or less.

The surface roughness Rz of the outer peripheral surface of the intermediate transfer belt is a ten-point mean roughness Rz measured according to JIS B 0601:1994. The surface roughness Rz is measured in an environment at 23° C. and 55% RH by using a contact-type surface roughness measuring device (SURFCOM 570A, manufactured by TOKYO SEIMITSU CO., LTD.). As a touch probe, a touch probe tipped with diamond (5 μmR, 90° cone) is used. The measurement conditions are: touch probe=touch probe tipped with diamond (5 μmR, 90° cone), measurement distance=2.5 mm, cutoff wavelength=0.8 mm, measurement speed=0.60 mm/s.

The measurement site is in the central portion of the outer peripheral surface of the intermediate transfer belt in the width direction. The surface roughness Rz is measured at 3 sites, and the average thereof is calculated.

Volume Resistivity of Intermediate Transfer Belt

From the viewpoint of transferability, the common logarithm of the volume resistivity that the intermediate transfer belt has in a case where a voltage of 500 V is applied thereto for 10 seconds is, for example, 9.0 (log Ω·cm) or more and 13.5 (log Ω·cm) or less, more preferably 9.5 (log Ω·cm) or more and 13.2 (log Ω·cm) or less, and particularly preferably 10.0 (log Ω·cm) or more and 12.5 (log Ω·cm) or less.

The volume resistivity that the intermediate transfer belt has in a case where a voltage of 500 V is applied thereto for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the volume resistivity (log Ω·cm) is measured at a total of 18 spots in the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Surface Resistivity of Intermediate Transfer Belt

From the viewpoint of transferability to embossed paper, the common logarithm of the surface resistivity that the intermediate transfer belt has in a case where a voltage of 500 V is applied to the outer peripheral surface thereof for 10 seconds is, for example, preferably 10.0 (log Ω/suq.) or more 15.0 (log Ω/suq.) or less, more preferably 10.5 (log Ω/suq.) or more and 14.0 (log Ω/suq.) or less, and particularly preferably 11.0 (log Ω/suq.) or more and 13.5 (log Ω/suq.) or less.

The unit log Ω/sq. of the surface resistivity represents the surface resistivity using the logarithmic value of the resistance value per unit area, which is also written as log Ω/sq.), log Ω/square, log Ω/□, or the like.

The surface resistivity that the intermediate transfer belt has in a case where a voltage of 500 V is applied to the outer peripheral surface thereof for 10 seconds is measured by the following method.

By using a microammeter (R8430A manufactured by ADVANTEST CORPORATION) as a resistance meter and a UR probe (manufactured by Mitsubishi Chemical Analytech Co., Ltd.) as a probe, the surface resistivity (log Ω/suq.) of the outer peripheral surface of the intermediate transfer belt is measured at a total of 18 spots within the outer peripheral surface of the intermediate transfer belt, 6 spots at equal intervals in the circumferential direction and 3 spots in the central portions and both end portions in the width direction, at a voltage of 500 V under a pressure of 1 kgf for a voltage application time of 10 seconds, and the average thereof is calculated. The surface resistivity is measured in an environment of a temperature of 22° C. and a humidity of 55% RH.

Image Forming Apparatus

The image forming apparatus according to the present exemplary embodiment includes a photoreceptor, a charging device that charges the photoreceptor, an electrostatic latent image forming device that forms an electrostatic latent image on a surface of the charged photoreceptor, a developing device that develops the electrostatic latent image formed on the surface of the photoreceptor with a toner to form a toner image, a transfer device that transfers the toner image formed on the photoreceptor to a surface of a recording medium, a belt that is a member to be cleaned, and a belt cleaning blade that brings the aforementioned contact part into contact with a surface of the belt to clean the surface.

As described above, examples of the belt as the member to be cleaned include an intermediate transfer belt, a secondary transfer belt, a paper transport belt, and the like. Furthermore, as the belt cleaning blade, the belt cleaning blade according to the present exemplary embodiment is used.

As the image forming apparatus according to the present exemplary embodiment, known image forming apparatuses are used which include an apparatus including a fixing unit that fixes a toner image transferred to a surface of a recording medium; an apparatus including a cleaning device that cleans a surface of a photoreceptor not yet being charged after transfer of a toner image; an apparatus including an electricity removing device that removes electricity by irradiating a surface of a photoreceptor, the photoreceptor not yet being charged, with electricity removing light after transfer of a toner image; an apparatus including a photoreceptor heating member that raises the temperature of a photoreceptor to reduce relative temperature, and the like.

Furthermore, as the image forming apparatus according to the present exemplary embodiment, a direct transfer-type apparatus that transfers a toner image formed on a surface of a photoreceptor directly to a recording medium; and an intermediate transfer-type apparatus that performs primary transfer of a toner image formed on a surface of a photoreceptor to a surface of an intermediate transfer belt and performs secondary transfer of the toner image transferred to the surface of the intermediate transfer belt to a surface of a recording medium are also used.

In the case of the intermediate transfer-type apparatus, the transfer device is configured with, for example, an intermediate transfer belt that has a surface onto which a toner image is to be transferred, a primary transfer device that performs primary transfer of the toner image formed on a surface of a photoreceptor to a surface of the intermediate transfer belt, and a secondary transfer device that performs secondary transfer of the toner image transferred to the surface of the intermediate transfer belt to a surface of a recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the photoreceptor may have a cartridge structure (process cartridge) that is attachable to and detachable from the image forming apparatus.

Hereinafter, an example of the image forming apparatus according to the present exemplary embodiment will be described with reference to drawings. Here, the image forming apparatus according to the present exemplary embodiment is not limited thereto. Main parts shown in the figures will be described, but description of other parts will not be provided.

Figure 2:
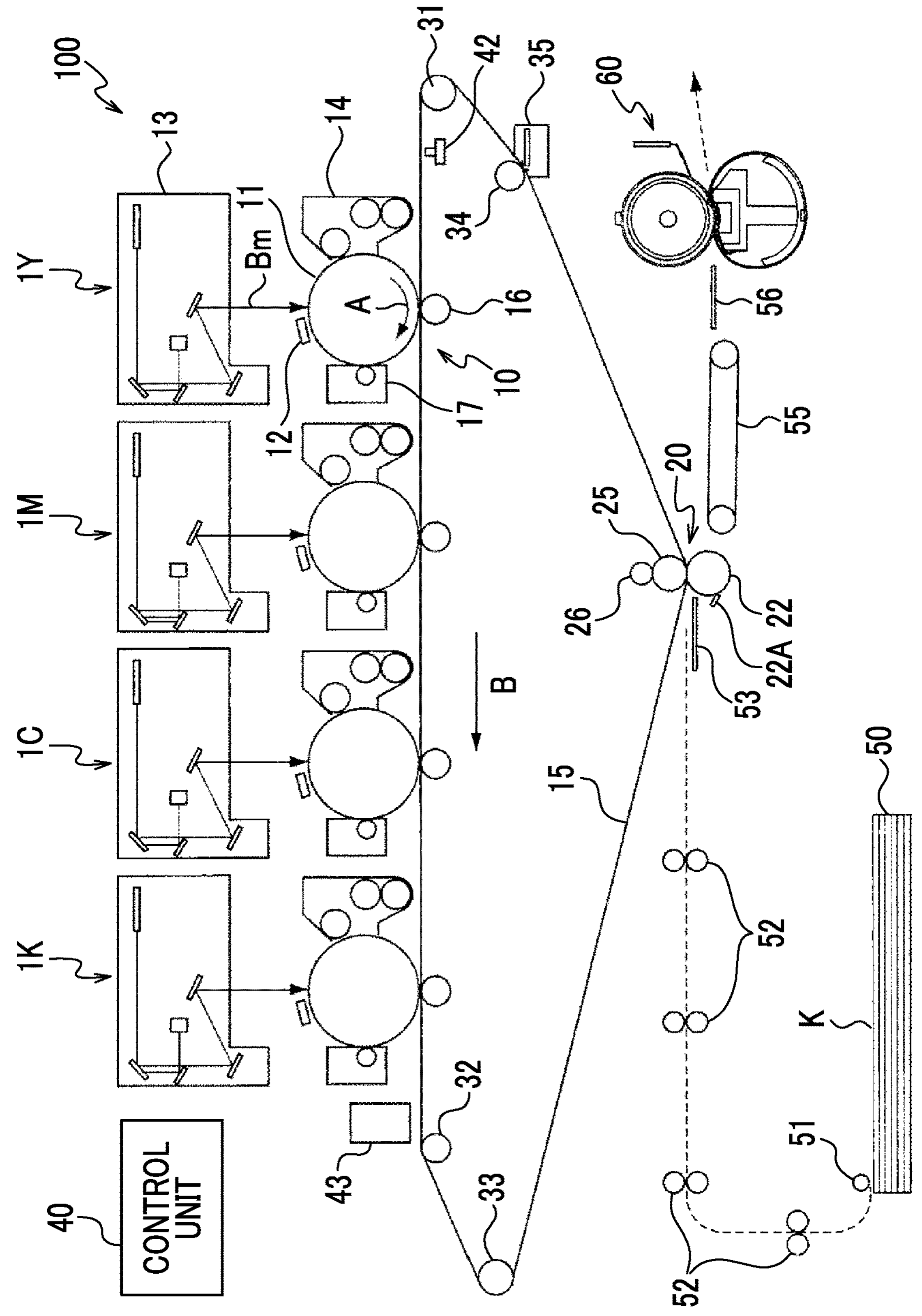
FIG. 2 is a schematic configuration view showing an example of an image forming apparatus according to the present exemplary embodiment.

FIG. 2 is a schematic configuration view showing the configuration of the image forming apparatus according to the present exemplary embodiment.

As shown in FIG. 2, an image forming apparatus 100 according to the present exemplary embodiment is, for example, an intermediate transfer-type image forming apparatus that is generally called a tandem type, and includes a plurality of image forming units 1Y, 1M, 1C, and 1K (an example of a toner image forming device) in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control unit 40 that controls the operation of each device (each portion).

Each of the image forming units 1Y, 1M, 1C, and 1K of the image forming apparatus 100 includes a photoreceptor 11 that holds the toner image formed on the surface thereof and rotates in the direction of an arrow A.

Around the photoreceptor 11, there are provided a charger 12 for charging the photoreceptor 11 as an example of a charging device and a laser exposure machine 13 for drawing an electrostatic latent image on the photoreceptor 11 as an example of an electrostatic latent image forming device (in Figure, the exposure beam is represented by a mark Bm).

Around the photoreceptor 11, as an example of a developing device, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10. Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

By various rolls, the intermediate transfer belt 15 is driven to circulate (rotate) in a direction B shown in FIG. 2 at a speed fit for the purpose. As the various rolls, a driving roll 31 that is driven by a motor (not shown in the drawing) excellent in maintaining a constant speed and rotates the intermediate transfer belt 15, a supporting roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided to face a secondary transfer belt-cleaning blade 35 scrapping off the residual toner or the like on the intermediate transfer belt 15 are provided.

As the secondary transfer belt-cleaning blade 35, the belt cleaning blade according to the present exemplary embodiment is used. At this time, the intermediate transfer belt 15 corresponds to a belt that is a member to be cleaned.

The primary transfer portion 10 is configured with the primary transfer roll 16 that is arranged to face the photoreceptor 11 across the intermediate transfer belt 15. Then, the primary transfer roll 16 is arranged to be pressed on the photoreceptor 11 with the intermediate transfer belt 15 interposed therebetween, and is configured such that a voltage (primary transfer bias) with an opposite polarity to a charging polarity (minus polarity and the same applies below) of the toner is applied to the primary transfer roll 16. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 comprises the back roll 25 and a secondary transfer roll 22 that is arranged on a toner image-holding surface side of the intermediate transfer belt 15.

The back roll 25 is formed such that the surface resistivity thereof is $1\times10^{7}\Omega/\square$ or more and $1\times10^{10}\Omega/\square$ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

On the other hand, the secondary transfer roll 22 is a cylindrical roll having a volume resistivity of $10^{7.5}$ Ω·cm or more and $10^{8.5}$ Ω·cm or less. The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, the secondary transfer belt-cleaning blade 35 separable from the intermediate transfer belt 15 is provided which removes the residual toner or paper powder on the intermediate transfer belt 15 remaining after the secondary transfer and cleans the outer peripheral surface of the intermediate transfer belt 15.

On the downstream side of the secondary transfer portion 20 of the secondary transfer roll 22, a secondary transfer roll-cleaning member 22A is provided which removes the residual toner or paper powder on the secondary transfer roll 22 remaining after the secondary transfer and cleans the outer peripheral surface of the intermediate transfer belt 15. Examples of the secondary transfer roll-cleaning member 22A include a cleaning blade. The secondary transfer roll-cleaning member 22A may be a cleaning roll.

The image forming apparatus 100 may have a configuration in which the apparatus includes a secondary transfer belt (an example of a secondary transfer member) instead of the secondary transfer roll 22.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. On the downstream side of the black image forming unit 1K, an image density sensor 43 for adjusting image quality is arranged. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control unit 40 based on the recognition of the reference signal.

The image forming apparatus according to the present exemplary embodiment includes, as a transport unit for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, by using the image forming apparatus shown in FIG. 2, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the polarity of the charging polarity (negative polarity) of the toner is applied to the base material of the intermediate transfer belt 15, and the toner images are sequentially overlapped on the outer peripheral surface of the intermediate transfer belt 15 and subjected to primary transfer.

After the primary transfer by which the toner images are sequentially transferred to the outer peripheral surface of the intermediate transfer belt 15, the intermediate transfer belt 15 moves, and the toner images are transported to the secondary transfer portion 20. In a case where the toner images are transported to the secondary transfer portion 20, in the transport unit, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images. In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an output portion of the image forming apparatus.

After the transfer to the paper K is finished, the residual toner remaining on the intermediate transfer belt 15 is transported to the secondary transfer belt-cleaning blade 35 as the intermediate transfer belt 15 rotates, and is removed from the intermediate transfer belt 15 by the secondary transfer belt-cleaning blade 35.

Transfer Device

The transfer device according to the present exemplary embodiment includes an intermediate transfer belt that has a surface to which a toner image is to be transferred, a primary transfer device that performs primary transfer of a toner image formed on a surface of a photoreceptor to the surface of the intermediate transfer belt, a secondary transfer device that performs secondary transfer of the toner image transferred to the surface of the intermediate transfer belt to a surface of a recording medium, and a cleaning blade that brings the aforementioned contact part into contact with the surface of the intermediate transfer belt to clean the surface.

As the cleaning blade, the belt cleaning blade according to the present exemplary embodiment is used.

The intermediate transfer belt in the transfer device according to the present exemplary embodiment is as described above.

The primary transfer device has a primary transfer member that is arranged to face the photoreceptor across the intermediate transfer belt. In the primary transfer device, by the primary transfer member, a voltage with polarity opposite to charging polarity of a toner is applied to the intermediate transfer belt, such that primary transfer of a toner image to the outer peripheral surface of the intermediate transfer belt is performed.

The secondary transfer device has a secondary transfer member that is arranged on a toner image-holding side of the intermediate transfer belt. The secondary transfer device has, for example, a secondary transfer member and a back surface member that is arranged on the side opposite to the toner image-holding side of the intermediate transfer belt. In the secondary transfer device, the intermediate transfer belt and the recording medium are interposed between the secondary transfer member and the back surface member, and a transfer electric field is formed. In this way, the toner image transferred to the surface of the intermediate transfer belt is transferred to a recording medium by secondary transfer.

The secondary transfer member may be a secondary transfer roll or a secondary transfer belt. As the back surface member, for example, a back roll is used.

The transfer device according to the present exemplary embodiment may be a transfer device that transfers a toner image to the surface of a recording medium via a plurality of intermediate transfer belts. That is, the transfer device may be, for example, a transfer device of performing primary transfer of a toner image to a first intermediate transfer belt from a photoreceptor, performing secondary transfer of the toner image to a second intermediate transfer belt from the first intermediate transfer belt, and then performing tertiary transfer of the toner image to a recording medium from the second intermediate transfer belt.

Hitherto, the present exemplary embodiment has been described. However, the present exemplary embodiment is not limited to the above exemplary embodiments, and various modifications, changes, and ameliorations can be added thereto.

EXAMPLES

Examples of the present invention will be described below, but the present invention is not limited to the following examples. In the following description, all "parts" and "%" are in terms of mass unless otherwise specified.

Example 1

Production of Belt Cleaning Blade (CB1)

A polycaprolactone polyol (manufactured by Daicel Corporation, PLACCEL 205) and a polycaprolactone polyol (manufactured by Daicel Corporation, PLACCEL 240) are used as a hard segment material of a polyol component. Furthermore, an acrylic resin containing two or more hydroxy groups (Soken Chemical & Engineering Co., Ltd., ACTFLOW UMB-2005B) is used as a soft segment material. The aforementioned hard segment material and the soft segment material are mixed together at a proportion of 8:2 (mass ratio).

Then, as an isocyanate compound, 4,4'-diphenylmethane diisocyanate (manufactured by Nippon Polyurethane Industry Co., Ltd., MILLIONATE MT) is added to 100 parts of the mixture of the hard segment material and the soft segment material, and the obtained mixture is reacted at 70° C. for 3 hours in a nitrogen atmosphere. Subsequently, the aforementioned isocyanate compound is further added thereto, and the obtained mixture is reacted at 70° C. for 3 hours in a nitrogen atmosphere, thereby obtaining a prepolymer.

Thereafter, the prepolymer is heated to 100° C. and defoamed under reduced pressure for 1 hour. Then, a mixture of 1,4-butanediol and trimethylolpropane is added to the prepolymer and mixed for 3 minutes such that air bubbles are not created, thereby preparing a composition for molding a cleaning blade. The composition for molding a cleaning blade is poured into an adjusted centrifugal molding machine and subjected to a curing reaction. As a result, a blade-shaped molded product is obtained.

Subsequently, the blade-shaped molded product is dipped in a 4,4'-diphenylmethane diisocyanate (TOSOH CORPORATION, MILLIONATE MT) bath at 80° C. for 45 minutes to be subjected to impregnation treatment, then taken out of the bath, aged and heated, then dried at room temperature, and cut in a length of 15 mm and a thickness of 2 mm.

By the above operation, a belt cleaning blade (CB1) is obtained.

Examples 2 to 21

Production of Belt Cleaning Blades (CB2) to (CB21)

Cleaning blades (CB2) to (CB21) are obtained in the same manner as Cleaning blade (CB1) except that for 4,4'-diphenylmethane diisocyanate, the degree of polymerization, the impregnation treatment time, and the impregnation treatment temperature are appropriately changed as necessary to perform an impregnation treatment and the physical properties are adjusted as shown in Table 1 below.

Comparative Examples A1 to A8

Production of Belt Cleaning Blades (CBC1) to (CBC8)

Cleaning blades (CBC1) to (CBC8) are obtained in the same manner as Cleaning blade (CB1) except that for 4,4'-diphenylmethane diisocyanate, the degree of polymerization, the impregnation treatment time, and the impregnation treatment temperature are appropriately changed as necessary to perform an impregnation treatment and the physical properties are adjusted as shown in Table 1 below.

Measurement of Proportion $H_X$, Proportion $H_Y$, Proportion $H_Z$, Proportion $D_X$, Proportion $D_Y$, and Proportion $D_Z$ With respect to the obtained belt cleaning blades of each example, the proportion $H_X$, the proportion $H_Y$, the proportion $H_Z$, the proportion $D_X$, the proportion $D_Y$, and the proportion $D_Z$ are measured by the method described above.

The results are listed in Table 1.

Preparation of Intermediate Transfer Belt

An intermediate transfer belt (BE1) consisting of a single polyimide-based resin layer is prepared. The surface roughness Rz on the outer peripheral surface of the intermediate transfer belt (BE1) is 0.07 μm.

Evaluation

According to the combination shown in Table 1, the intermediate transfer belt and the intermediate transfer belt-cleaning blade are mounted on an image forming apparatus "Apeos C8180 from FUJIFILM Business Innovation Corp.", thereby obtaining an image forming apparatus for evaluation. As conditions for mounting the intermediate transfer belt-cleaning blade, a pressing force NF (Normal Force) is set to 2.6 gf/mm, and an angle W/A (Working Angle) is set to 20°.

By using the image forming apparatus, the following evaluation is performed.

Evaluation of Abrasion Resistance and Chipping Resistance

By using the image forming apparatus for evaluation, images with an image density of 50% are printed on A4 paper (210×297 mm, FUJIFILM Business Innovation Corp., P paper) in an environment of 32.5° C. and 85% RH until the cumulative rotation number of the photoreceptor reaches 100,000 cycles. After the printing, the edge portion (the side portion in contact with the belt) of the cleaning blade is evaluated as below.

The abrasion loss of the edge portion of the cleaning blade is measured based on the maximum abrasion depth of the edge portion of the belt surface side, the maximum abrasion depth being checked in a case where the cleaning blade is observed with a laser microscope VK-8510 manufactured by KEYENCE CORPORATION. Based on the obtained values, the abrasion resistance is evaluated according to the following evaluation standard.

In addition, whether or not the edge portion of the cleaning blade is chipped and the size of the chip are observed with a laser microscope VK-8510 manufactured by KEYENCE CORPORATION. Based on the obtained observation results, the chipping resistance is evaluated according to the following evaluation standard.

Standard for Abrasion Resistance

- G1: The abrasion loss of the edge portion is 3 μm or less.
- G2: The abrasion loss of the edge portion is more than 3 μm and 5 μm or less.
- G3: The abrasion loss of the edge portion is more than 5 μm and 7 μm or less.
- G4: The abrasion loss of the edge portion is more than 7 μm and 9 μm or less.
- G5: The abrasion loss of the edge portion is more than 9 μm and 11 μm or less.
- G6: The abrasion loss of the edge portion is more than 11 μm.

Standard for Chipping Resistance

- G1: No chipping occurs on the edge portion.
- G2: The size of the chip of the edge portion is 1 μm or less, and the number of chips is 1 or more and less than 5.
- G3: The size of the chip of the edge portion is 1 μm or less, and the number of chips is 5 or more.
- G4: The size of the chip of the edge portion is more than 1 μm and 5 μm or less, and the number of chips is 1 or more and less than 5.
- G5: The size of the chip of the edge portion is more than 1 μm and 5 μm or less, and the number of chips is 5 or more and less than 10.
- G6: The size of the chip of the edge portion is more than 1 μm and 5 μm or less, and the number of chips is 10 or more.

TABLE 1

| | Intermediate transfer belt | Belt cleaning blade | | | | | | | Evaluation | |
|---|---|---|---|---|---|---|---|---|---|---|
| | | Type | Proportion $H_X$ [%] | Proportion $H_Y$ [%] | Proportion $H_Z$ [%] | Proportion $D_X$/Proportion $H_X$ | Proportion $D_Y$/Proportion $H_Y$ | Proportion $D_Z$/Proportion $H_Z$ | Abrasion resistance | Chipping resistance |
| Example 1 | (BE1) | (CB1) | 24.3 | 57.9 | 47.4 | 0.83 | 0.72 | 0.19 | G1 | G1 |
| Example 2 | (BE1) | (CB2) | 19.5 | 50.6 | 40.6 | 1.05 | 0.83 | 0.23 | G1 | G1 |
| Example 3 | (BE1) | (CB3) | 25.5 | 41.0 | 32.2 | 0.79 | 1.02 | 0.28 | G2 | G1 |
| Example 4 | (BE1) | (CB4) | 16.7 | 60.3 | 48.0 | 1.25 | 0.70 | 0.20 | G2 | G2 |
| Example 5 | (BE1) | (CB5) | 15.4 | 39.1 | 31.8 | 1.33 | 1.08 | 0.29 | G2 | G2 |
| Example 6 | (BE1) | (CB6) | 17.6 | 50.4 | 41.0 | 1.11 | 0.82 | 0.20 | G2 | G1 |
| Example 7 | (BE1) | (CB7) | 25.8 | 50.7 | 39.3 | 0.83 | 0.85 | 0.26 | G2 | G1 |
| Example 8 | (BE1) | (CB8) | 20.1 | 39.2 | 47.9 | 1.01 | 1.07 | 0.19 | G2 | G1 |
| Example 9 | (BE1) | (CB9) | 19.9 | 60.5 | 32.1 | 1.00 | 0.69 | 0.28 | G2 | G2 |
| Example 10 | (BE1) | (CB10) | 26.0 | 39.8 | 31.4 | 0.65 | 0.46 | 0.22 | G1 | G2 |
| Example 11 | (BE1) | (CB11) | 23.9 | 60.0 | 48.6 | 0.96 | 0.41 | 0.10 | G1 | G2 |
| Example 12 | (BE1) | (CB12) | 25.6 | 45.9 | 33.5 | 0.60 | 0.78 | 0.19 | G1 | G2 |
| Example 13 | (BE1) | (CB13) | 15.5 | 46.6 | 38.2 | 1.61 | 0.73 | 0.17 | G2 | G1 |
| Example 14 | (BE1) | (CB14) | 25.9 | 46.1 | 33.4 | 0.55 | 0.75 | 0.20 | G1 | G3 |
| Example 15 | (BE1) | (CB15) | 15.3 | 46.4 | 37.8 | 1.66 | 0.71 | 0.18 | G3 | G1 |
| Example 16 | (BE1) | (CB16) | 18.2 | 58.4 | 35.7 | 1.05 | 0.31 | 0.16 | G1 | G2 |
| Example 17 | (BE1) | (CB17) | 15.7 | 39.2 | 40.8 | 1.29 | 1.16 | 0.22 | G2 | G1 |
| Example 18 | (BE1) | (CB18) | 18.1 | 59.0 | 35.6 | 1.10 | 0.27 | 0.16 | G1 | G3 |
| Example 19 | (BE1) | (CB19) | 16.0 | 59.3 | 46.1 | 1.24 | 0.68 | 0.05 | G2 | G2 |
| Example 20 | (BE1) | (CB20) | 25.9 | 58.7 | 31.5 | 0.92 | 0.76 | 0.33 | G1 | G2 |
| Example 21 | (BE1) | (CB21) | 15.8 | 59.1 | 48.3 | 1.26 | 0.70 | 0.03 | G2 | G3 |
| Comparative Example 1 | (BE1) | (CBC1) | 14.8 | 38.0 | 30.3 | 1.28 | 0.93 | 0.18 | G5 | G1 |
| Comparative Example 2 | (BE1) | (CBC2) | 12.0 | 62.6 | 50.2 | 1.38 | 0.56 | 0.11 | G6 | G4 |
| Comparative Example 3 | (BE1) | (CBC3) | 27.8 | 61.7 | 49.9 | 0.80 | 0.66 | 0.19 | G1 | G5 |
| Comparative Example 4 | (BE1) | (CBC4) | 28.4 | 36.1 | 29.5 | 0.60 | 1.14 | 0.33 | G1 | G6 |
| Comparative Example 5 | (BE1) | (CBC5) | 14.1 | 40.3 | 40.6 | 1.48 | 0.94 | 0.19 | G6 | G2 |
| Comparative Example 6 | (BE1) | (CBC6) | 29.3 | 50.9 | 39.1 | 0.69 | 0.57 | 0.17 | G1 | G4 |
| Comparative Example 7 | (BE1) | (CBC7) | 18.6 | 37.4 | 42.0 | 1.06 | 0.54 | 0.13 | G4 | G1 |
| Comparative Example 8 | (BE1) | (CBC8) | 23.7 | 62.8 | 43.4 | 0.80 | 0.36 | 0.21 | G1 | G5 |

The above results tell that the belt cleaning blades of the present examples outperform the belt cleaning blades of comparative examples in terms of both the abrasion resistance and chipping resistance.

Hereinafter, aspects of the present exemplary embodiment will be described.

(((1))) A belt cleaning blade comprising:

a contact part that is brought into contact with at least a surface of a belt which is a member to be cleaned, wherein the contact part is configured of polyurethane rubber containing a hard segment and a soft segment, and in a surface of the contact part, a proportion $H_X$ occupied by domains of the hard segment is 15.2% or more and 26.1% or less, and a proportion $H_Y$ occupied by an area of the domains of the hard segment having an area of 200 $nm^2$ or more and 1,000 $nm^2$ or less to a total area of the domains of the hard segment in the surface is 38.9% or more and 60.8% or less.

(((2))) The belt cleaning blade according to (((1))

wherein the proportion $H_X$ is 18.4% or more and 25.3% or less.

(((3))) The belt cleaning blade according to (((1))), wherein the proportion $H_Y$ is 39.9% or more and 59.2% or less.

(((4))) The belt cleaning blade according to (((1))), wherein the proportion $H_X$ is 18.4% or more and 25.3% or less, and the proportion $H_Y$ is 39.9% or more and 59.2% or less.

(((5)) The belt cleaning blade according to any one of (((1))) to (((4))), wherein a proportion $H_Z$ of a number of the domains of the hard segment having an area of 200 $nm^2$ or more and 1,000 $nm^2$ or less to a total number of the domains of the hard segment in the surface is 31.2% or more and 48.7% or less.

(((6))) The belt cleaning blade according to any one of (((1))) to ((5))), wherein in a case where, in a cross section of the contact part, a proportion occupied by the domains of the hard segment to a total area of the cross section is defined as $D_X$, and a proportion occupied by an area of the domains of the hard segment having an area of 200 $nm^2$ or more and 1,000 $nm^2$ or less to a total area of the domains of the hard segment in the cross section is defined as $D_Y$, a ratio of the proportion $D_X$ to the proportion $H_X$ is 0.58 or more and 1.64 or less, and a ratio of the proportion $D_Y$ to the proportion $H_Y$ is 0.29 or more and 1.19 or less.

(((7))) The belt cleaning blade according to (((5))) or (((6))), wherein in a case where, in a cross section of the contact part, a proportion occupied by a number of the domains of the hard segment having an area of 200 $nm^2$ or more and 1,000 $nm^2$ or less to a total number of the domains of the hard segment is defined as $D_Z$, a ratio of the proportion $D_Z$ to the proportion $H_Z$ is 0.04 or more and 0.34 or less.

(((8))) An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to any one of (((1))) to (((7))) that brings the contact part into contact with a surface of the belt to clean the surface.

(((9))) A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to any one of (((1)) to 7))) that brings the contact part into contact with the surface of the intermediate transfer belt to clean the surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A belt cleaning blade comprising:

a contact part that is brought into contact with at least a surface of a belt which is a member to be cleaned, wherein the contact part is configured of polyurethane rubber containing a hard segment and a soft segment, and in a surface of the contact part, a proportion $H_X$ occupied by domains of the hard segment is 15.2% or more and 26.1% or less, and a proportion $H_Y$ occupied by an area of the domains of the hard segment having an area of 200 $nm^2$ or more and 1,000 $nm^2$ or less to a total area of the domains of the hard segment in the surface is 38.9% or more and 60.8% or less.

2. The belt cleaning blade according to claim 1, wherein the proportion $H_X$ is 18.4% or more and 25.3% or less.

3. The belt cleaning blade according to claim 1, wherein the proportion $H_Y$ is 39.9% or more and 59.2% or less.

4. The belt cleaning blade according to claim 1, wherein the proportion $H_X$ is 18.4% or more and 25.3% or less, and the proportion $H_Y$ is 39.9% or more and 59.2% or less.

5. The belt cleaning blade according to claim 1, wherein a proportion $H_Z$ of a number of the domains of the hard segment having an area of 200 $nm^2$ or more and 1,000 $nm^2$ or less to a total number of the domains of the hard segment in the surface is 31.2% or more and 48.7% or less.

6. The belt cleaning blade according to claim 1, wherein in a case where, in a cross section of the contact part, a proportion occupied by the domains of the hard segment to a total area of the cross section is defined as $D_X$, and a proportion occupied by an area of the domains of the hard segment having an area of 200 $nm^2$ or more and 1,000 $nm^2$ or less to a total area of the domains of the hard segment in the cross section is defined as $D_Y$, a ratio of the proportion $D_X$ to the proportion $H_X$ is 0.58 or more and 1.64 or less, and a ratio of the proportion $D_Y$ to the proportion $H_Y$ is 0.29 or more and 1.19 or less.

7. The belt cleaning blade according to claim 5, wherein in a case where, in a cross section of the contact part, a proportion occupied by a number of the domains of the hard segment having an area of 200 $nm^2$ or more and 1,000 $nm^2$ or less to a total number of the domains of the hard segment is defined as $D_Z$, a ratio of the proportion $D_Z$ to the proportion $H_Z$ is 0.04 or more and 0.34 or less.

8. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 1 that brings the contact part into contact with a surface of the belt to clean the surface.

9. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 2 that brings the contact part into contact with a surface of the belt to clean the surface.

10. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 3 that brings the contact part into contact with a surface of the belt to clean the surface.

11. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 4 that brings the contact part into contact with a surface of the belt to clean the surface.

12. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 5 that brings the contact part into contact with a surface of the belt to clean the surface.

13. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 6 that brings the contact part into contact with a surface of the belt to clean the surface.

14. An image forming apparatus comprising:

a photoreceptor;

a charging device that charges the photoreceptor;

an electrostatic latent image forming device that forms an electrostatic latent image on a surface of the charged photoreceptor;

a developing device that develops the electrostatic latent image formed on the surface of the photoreceptor with a toner to form a toner image;

a transfer device that transfers the toner image formed on the photoreceptor to a surface of a recording medium;

a belt that is a member to be cleaned; and the belt cleaning blade according to claim 7 that brings the contact part into contact with a surface of the belt to clean the surface.

15. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 1 that brings the contact part into contact with the surface of the intermediate transfer belt to clean the surface.

16. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 2 that brings the contact part into contact with the surface of the intermediate transfer belt to clean the surface.

17. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 3 that brings the contact part into contact with the surface of the intermediate transfer belt to clean the surface.

18. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 4 that brings the contact part into contact with the surface of the intermediate transfer belt to clean the surface.

19. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 5 that brings the contact part into contact with the surface of the intermediate transfer belt to clean the surface.

20. A transfer device comprising:

an intermediate transfer belt that has a surface to which a toner image is to be transferred;

a primary transfer device that performs primary transfer of a toner image formed on a surface of a photoreceptor to the surface of the intermediate transfer belt;

a secondary transfer device that performs secondary transfer of the toner image transferred to the surface of the intermediate transfer belt to a surface of a recording medium; and the belt cleaning blade according to claim 6 that brings the contact part into contact with the surface of the intermediate transfer belt to clean the surface.

* * * * *